Inventors
Robert B. Dunlap
Evald O. Peterson
Bertram A. Von Schoppe
by [signature] Atty

United States Patent Office 3,449,933
Patented June 17, 1969

3,449,933
AUTOMATIC ROUGHING MACHINE
Robert B. Dunlap, Medway, Evald O. Peterson, Lynnfield Center, and Bertram A. Von Schoppe, Watertown, Mass., assignors to Compo Industries, Inc., Waltham, Mass., a corporation of Delaware
Filed July 27, 1967, Ser. No. 656,379
Int. Cl. C14b 1/48; A43d 37/00
U.S. Cl. 69—6.5                                   23 Claims

ABSTRACT OF THE DISCLOSURE

A roughing machine for roughing the bottoms of lasted shoe uppers peripherally of the bottom by means of endless abrasive belts held in contact with the bottom and raised and lowered while in contact to follow the change in level of the bottom, the belts being supported in longitudinally spaced relation transversely of a conveyor and there being supports on the conveyor for moving successive lasted shoes, bottom up, beneath the belts for roughing of the bottoms along both sides.

*Background of the invention*

In United States Patent No. 3,371,510, dated Mar. 5, 1968 of Robert B. Dunlap, there is illustrated and described a roughing machine of the foregoing kind and this invention constitutes an improvement thereon in the provision of means for securing the lasted uppers to the conveyor, in means for supporting the roughing belts, in means for conforming the roughing belts to the surface of the bottom, and in means for terminating the roughing operation.

*Summary*

As herein illustrated, the machine comprises instrumentalities for operating on the bottoms of shoes, a conveyor movable along a path relative to the instrumentalities to move successive shoes one after another by the instrumentalities, last supporting means spaced lengthwise of the conveyor upon which the lasted uppers are adapted to be mounted bottom up, and locking means automatically operable as the conveyor moves each lasted upper toward the instrumentalities to lock the lasted upper on the last-supporting means. The locking means comprises a pressure operable motor on the conveyor, a manifold connected to a source of pressure, said manifold being mounted laterally of the conveyor, and means operable as the last-supporting means moves with the conveyor toward the instrumentality to engage a fitting on the manifold with the pressure-operable means to effect operation of the latter and then disconnect it without stopping the conveyor, that is, while the conveyor is moving. For this purpose the manifold is mounted on a carrier plate supported laterally of and substantially parallel to the conveyor for movement in the direction of the conveyor and concomitantly movement toward and away from the conveyor, and there is a lug on the carrier plate which projects laterally therefrom into the path of movement of the conveyor operable, by engagement with means on the last-supporting means, to effect movement of the carrier plate and the manifold mounted thereon into coupling engagement with the pressure-operable means and thereafter to disconnect it.

Two instrumentalities are employed situated in transversely spaced relation at opposite sides of the conveyor for operating on opposite sides of the bottom of the lasted upper as the latter travels between them and each is supported by a parallel bar linkage for rectilinear movement perpendicular to the conveyor and hence to the bottom of the lasted uppers on the conveyor. Each instrumentality is adjustable on its supporting linkage for angular adjustment about an axis parallel to the conveyor.

There is power-operable means for bringing each instrumentality into engagement with the bottom and causing it to rise and fall as the level of the bottom changes. Control of the level is provided for by a servovalve which supplies pressure to a pressure-operable motor. A shoe bottom feeler plate, by engagement with the bottom of a shoe as the latter approaches the instrumentality, effects operation of the servovalve to move the instrumentality to a position close to the bottom, and a gate operable by the leading end of a lasted upper as it enters the field of action of the instrumentality, retracts the bottom feeler plate and lowers the instrumentality into engagement with the bottom whereupon the instrumentality, by engagement with the bottom, effects operation of the servo to cause the instrumentality to follow the contour of the bottom and to maintain contact at a substantially uniform pressure.

Each instrumentality is a belt mounted on spaced pulleys, one of which is driven, the pulleys being mounted on the aforesaid linkage so that the belt extends transversely of the path of movement with its lower run above the path of movement and is movable as aforesaid downwardly into engagement with the bottom of a lasted upper on the conveyor. A backing member is pivotally mounted adjacent the inner side of the lower run of the belt and there is means for effecting angular movement of the backing means to cause it to deflect the belt to a position corresponding substantially to the slope of the bottom at the place of contact of the belt with the bottom. The angle of the bottom changes very little except at the shank and so timing means is provided for maintaining the backing member at an angle corresponding to the bottom at the forepart from the tip of the toe to the ball line whereupon it is displaced downwardly at the sharper angle for contact with the bottom between the ball line and the breast line that is throughout the shank and finally is restored to its initial position for operation on the heel end.

There are cams adjustably supported on the conveyor operable as the latter moves a shoe beyond a predetermined point to actuate switches which in turn cause the servo valves to raise the instrumentalities from the bottom thereby to terminate the roughing operation. Adjustment of these cams enables roughing the entire length of the shoe bottom or only a part thereof.

The operating circuit includes a pressure-operable switch operable if the pressure is less than a predetermined amount to stop the machine, a safety switch operable if a shoe is not locked to the conveyor to prevent operation of the roughers, and a manually operable emergency switch for stopping the machine.

The invention will now be described with reference to the accompanying drawings wherein.

Referring to the drawings (FIGS. 1 and 3), the apparatus comprises a housing 10 provided with a base 12 [an]d framework including spaced parallel, vertically disposed channel members 14 connected lengthwise of the [hou]sing by spaced parallel, longitudinally extending channel members 16 and crosswise of the housing by similar [ch]annel members not shown herein.

Figure 1:
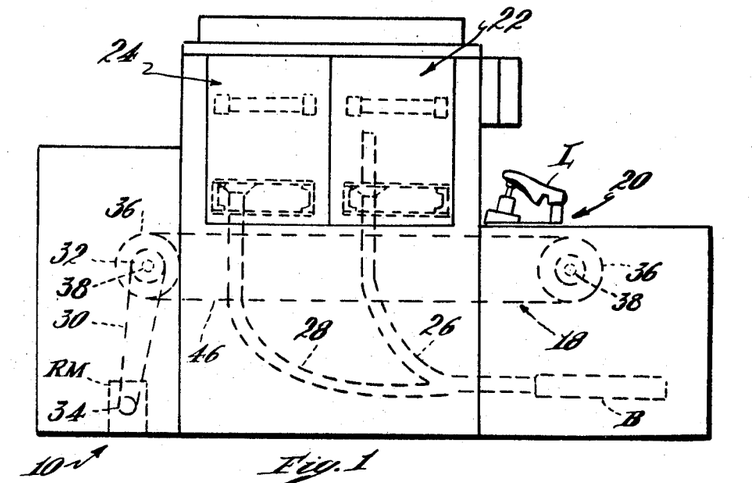
FIG. 1 is a side elevation of the machine.

The framework supports a conveyor 18 in a horizontal [po]sition, as shown in FIG. 1, on which are mounted a [pl]urality of pallets 20 for supporting lasted shoe uppers [bo]ttom side up, as illustrated, for movement successively [alo]ng the upper run of the conveyor to a first instrumentality 22 and then to a second instrumentality 24, [th]e first being designed to operate on one side of the [bo]ttom of the lasted upper and the second being designed [to] operate on the other side of the bottom of the lasted [up]per, each of the instrumentalities being substantially [id]entical in makeup except for the fact some parts are [le]ft-handed and others right-handed.

The instrumentalities comprise roughing devices which [ro]ugh the lasting margin of the upper and since this [cr]eates a dust problem conductor pipes 26 and 28, as [sh]own in FIG. 1, are provided to remove the dust as fast [as] it is formed, the conductor pipes 26 and 28 for this [pu]rpose being connected to an exhaust manifold B. The [co]nveyor is driven at its forward end, the left end, as [ill]ustrated in FIG. 1, by a chain 30, one end of which [is] entrained about a sprocket wheel 32 fast to the shaft [on] which the forward end of the conveyor is mounted, [an]d the other end of which is entrained about a sprocket [w]heel 34 fast to the shaft of a motor driven reduction [un]it Rm.

The conveyor 18 comprises transversely spaced sprocket[s] 36 (FIGS. 1 and 3) fixed to horizontally disposed [sh]afts 38 rotatably mounted in transversely spaced bearings 40, the latter being fastened to plates 42 extending [len]gthwise of the frame and supported thereon by angle [br]ackets 44. The forward one of the shafts 38 extends [la]terally beyond the right-hand one of the bearings 40, as [sh]own in FIG. 3, and has fixed to it the sprocket wheel [32] by means of which the conveyor is driven. Two end[le]ss chains 46 are entrained about the sprockets 36 and [su]pport the pallets 20 in longitudinally spaced relation. [E]ach pallet has at its underside a pair of downwardly [ex]tending, transversely spaced fixed lugs 50 (FIG. 5) [co]ntaining openings 52, and a pair of downwardly ex[te]nding, transversely spaced pivot lugs 54 containing openings 56 by means of which it is connected to the chains. As the chains are driven forwardly in a direction to the left, as shown by the arrow in FIG. 1, the pallets on which the shoes are supported move from the right-hand end of the machine toward the left along the upper run of the conveyor and then from left to right along the lower run of the conveyor.

Figure 4:
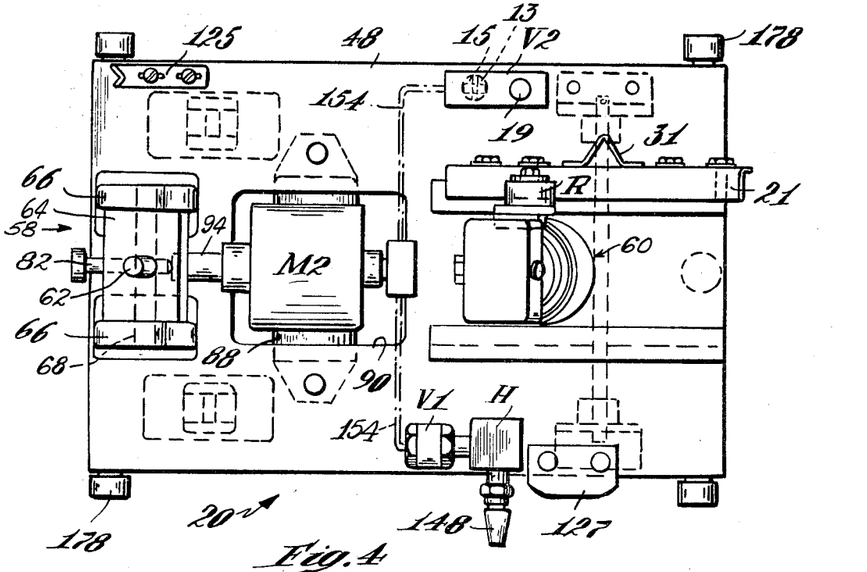
FIG. 4 is a plan view, to much larger scale, of the [sho]e supporting pallet on which the shoe is mounted for [mo]vement to a position for the roughing operation.
Figure 5:
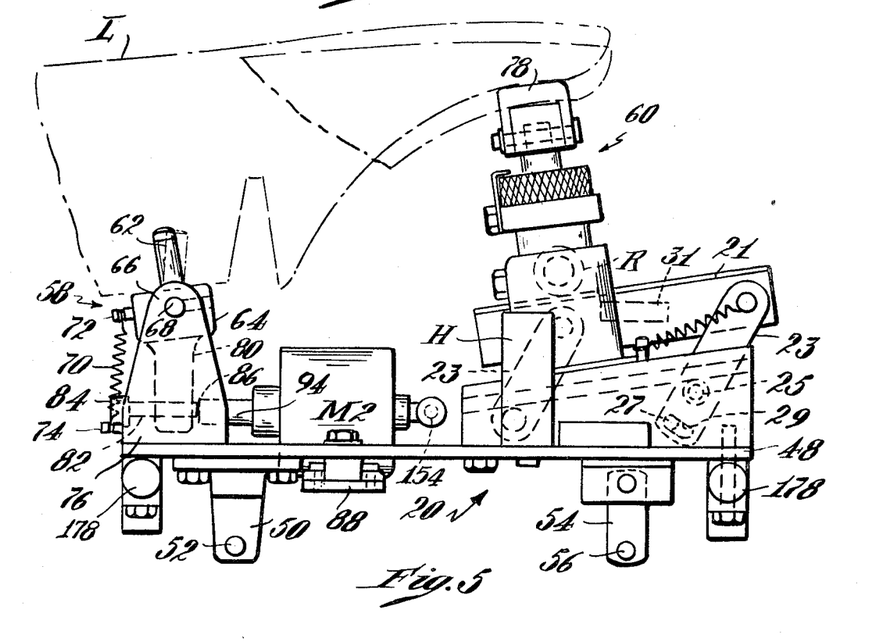
FIG. 5 is an elevation of FIG. 4.

Each pallet 20 (FIGS. 4 and 5) has on it shoe supporting means comprising a heel end support 58 and a toe end support 60. The heel end support is a pin 62 fixed in an upright position to a block 64, the latter being pivotally supported between spaced parallel, upstanding arms 66 on a horizontally disposed shaft 68, the ends of which are fixed to the aforesaid arms 66 for rotation about a horizontal axis toward and away from the toe support. A spring 70 stretched between a stud 72 fixed in the rear side of the block 64 and a stud 74 fixed to the rear side of the base 76 holds the pin 62 tilted rearwardly with respect to the toe support in a position convenient for placing a last L on the pin, as shown in dotted lines (FIGS. 1 and 5), preparatory to movement thereof with the conveyor to a position to be operated upon by the instrumentalities 22 and 24. It is necessary to lock the last rigidly in place after it is mounted on the pin 62 and this is accomplished by rotating the pin 62 forwardly, that it, in a clockwise direction, as seen in FIG. 5, to bring the toe of the lasted upper firmly into contact with a yieldably supported cushion 78 provided at the top of the toe support. The toe support and adjustments therefor both longitudinally with reference to the heel support and heightwise with respect thereto are substantially like the structure shown in the aforesaid United States Patent 3,371,510 and hence will not be described in detail herein.

In order to rotate or rock the pin 62 forwardly the block 64 has at its underside a downwardly projecting lug 80 through which there is threaded from the rear side a screw bolt 82 provided with a head 84 by means of which it may be adjusted therein to extend or retract its forward end 86. A motor M2, which preferably is fluid-operable, is mounted by means of a bracket plate 88 between the heel end support and the toe end support within an opening 90 in the pallet 20 and has projecting rearwardly therefrom a rod 94 which is in axial alignment with the forward end 86 of the screw 82. Thus rearward movement of the piston rod 94 will, by engagement with the screw 82, move the lug 80 rearwardly and hence rock the pin 62 forwardly about the shaft 68. Forward movement of the pin 62 will, of course, rock the lasted shoe upper downwardly to bring the toe into firm contact with the cushion 78 at the same time depressing the support.

Figure 6:
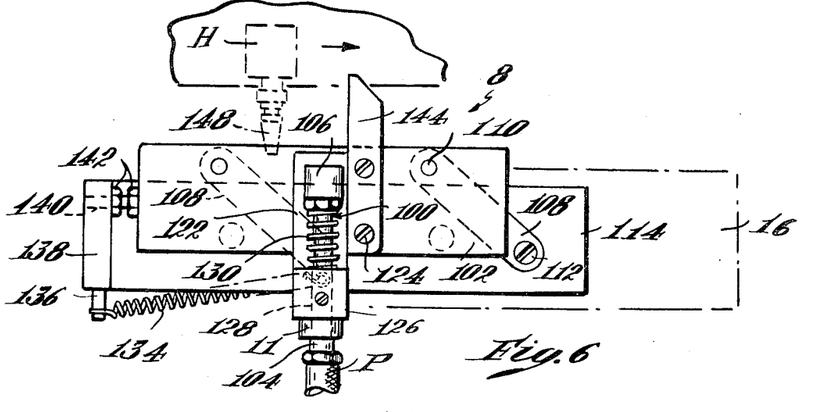
FIG. 6 is a fragmentary plan view at one side of the [con]veyor showing a manifold mounted for movement to [p]osition to connect a source of air pressure to a motor [on] the conveyor.
Figure 7:
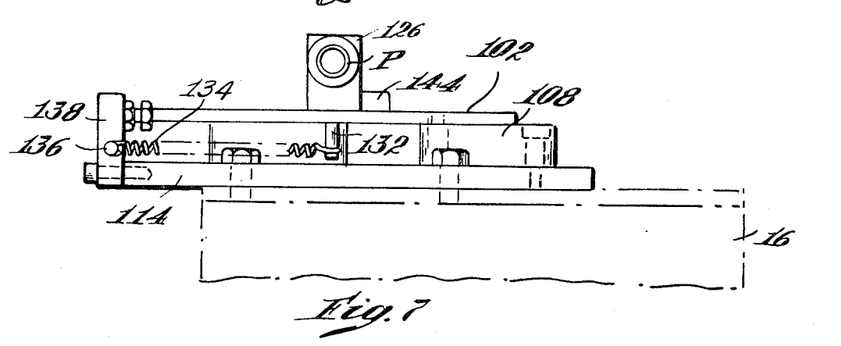
FIG. 7 is an elevation taken on the line 7—7 of [FI]G. 6.
Figure 8:
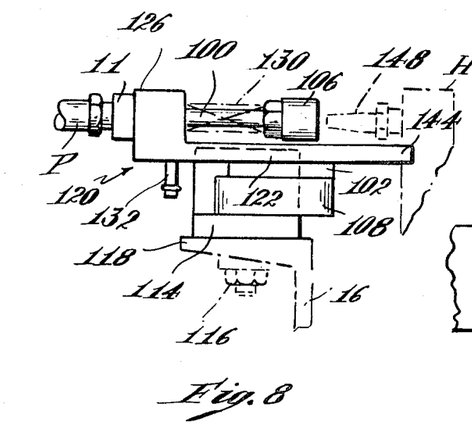
FIG. 8 is an elevation taken on the line 8—8 of [FI]G. 6.
Figure 9:
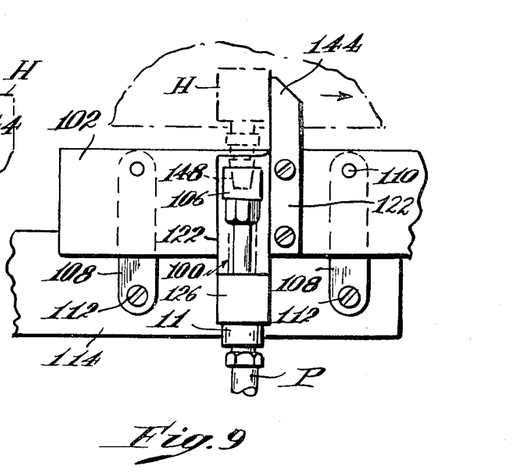
FIG. 9 is a plan view showing the manifold in its [op]erative position.

It is desirable to have the lasted upper automatically locked in position so as to free the operator from having any more to do than merely place the lasted upper on the pin 62 by engaging the hole at the heel end of the last with the pin and orienting the last with respect to the direction of movement so that the toe overlies and rests lightly upon the cushion 78. Since the conveyor is moving constantly means is provided for supplying a pressure fluid to the motor M2 to effect the aforesaid locking while the conveyor is in motion. Pressure is supplied from a suitable source, for example, a compressor C (FIG. 3) located below the conveyor driven by a motor M3, or from a factory source of air (not shown) pressure through a suitable flexible conductor P (FIGS. 6, 7 and 8) to a manifold 100 supported laterally of the upper run of the conveyor for movement from a predetermined lateral position forwardly and inwardly for supplying air to the motor M2 while the latter is moving and then outwardly and rearwardly to its lateral position. The manifold is yieldingly mounted in a transverse position on a carrier plate 102 and has at its outer end a nipple 104 with which the flexible conduit P is adapted to be engaged, for example, by pushing it over the nipple and at its opposite end a fitting 106 containing a spring-pressed valve (not shown) normally held closed so as to prevent escape of pressure through the fitting until depressed. The carrier plate 102 is supported at the inner end of a pair of spaced parallel arms 108 on pivot pins 110. The outer ends of the arms 108 are pivotally connected by means of pins 112 to a plate 114, the latter being fastened by bolts 116 (FIG. 8) to the upper horizontal flange 18 of one of the longitudinal channel members 16. The manifold 100 is mounted on the carrier plate 102 by means of an L-shaped bracket member 120 (FIG. 8) having a horizontal leg 122 recessed into the upper surface of the carrier plate 102 and secured thereto by bolts 124 and has a vertically projecting lug 126, containing a transversely extending, horizontal opening 128 (FIG. 6) in which the manifold 100 is mounted. A collar 11 is fixed to the manifold outwardly of the lug 126 and a spring 130 coiled about the manifold between the inner side of the lug and the fitting 106 yieldably holds the fitting displaced inwardly toward the conveyor. A stud 132 is fixed in the lower side of the bracket member 120 and provides means for securing one end of a spring 134, the opposite end of which is secured to a stud 136 fixed to an upstanding block 138 fastened to the left end of the plate 114. A screw bolt 140 is threaded into the block 138 so that its head 142 is in alignment with the carrier plate 102 and provides a stop against which the carrier plate 102 is held by the spring 134 and into engagement with which it is returned after having been moved forwardly with the conveyor to supply air pressure to the motor M2 on the conveyor. Movement of the carrier plate to effect delivery of air pressure to the motor on the conveyor as it moves toward the operating instrumentalities is effected by a lug 144 which constitutes a prolongation of the leg 122 which extends transversely of the path of movement of the conveyor far enough so that when the carrier plate 102 is at its lateral position in engagement with the stop, movement of the last-supporting plate 48 toward the operating instrumentalities engages a block H fixed to the plate 48 with the lug 144 and, because the carrier plate to which the lug 144 is affixed is supported by the parallel bar linkage constituted by the pivotally mounted arms 108, the carrier plate will move forwardly in the direction of movement of the conveyor and concomitantly inwardly toward the conveyor. The linkage is so proportioned that the inward movement of the carrier plate will bring the valved fitting 106 at the inner end of the manifold 100 into engagement with a nipple 148 screwed into the block H. The lateral movement of the carrier plate causes the nipple 148 to depress the spring-pressed ball at the inner end of the fitting and so to admit pressure through the nipple 148 into the block H. The block H is hollow and has connected to it a one-way valve V1 (FIG. 4) from which a conductor pipe 154 extends and is connected to the motor M2 to supply pressure thereto. As the outer ends of the arms 108 move by their pivot pins 112 at their inner ends in the direction of travel of the conveyor, the carrier plate 122 commences to move outwardly relative to the conveyor and this outward movement uncouples the fitting 106 from the nipple 148. Further movement in the direction of travel disengages the block H and lug 144 so that the carrier plate is now free and is returned by the spring 134 to its lateral position against the stop 142. The valve V1 is a one-way valve biased in a direction to close and hold the pressure in the motor M2, so that it is only necessary to connect the source of pressure to the motor for a sufficient length of time to actuate it, whereupon the motor locks in position and the source may be disconnected. The motor will remain under pressure and hence in locking position until the pressure is released. The pressure is released from the motor after the pallet 20 has traveled beyond the roughing instrumentality and preferably just before it reaches the position for reloading, so that the operator unloads and loads at the same position. Release of the pressure is provided for by an exhaust valve V2 secured to the underside of the pallet 20 and connected to the motor M2 by an extension 154x of the pipe 154. The valve (FIG. 4) has projecting downwardly from it a sprii pressed pin 13 on which there is mounted a roller A cam (not shown) is mounted below the plate 48 alon side the conveyor so that as the latter moves over it 1 roller 15 will rise up on it, opening the valve V2 and allo ing the pressure to vent from the valve through a port The machine is designed, as will appear hereinaft automatically to lower roughing instrumentalities ir engagement with the bottom of the lasted uppers as th are moved into position beneath the roughing instrume talities. In the absence of a lasted upper on the shoe su ports, the roughing instrumentalities would be lower into engagement with the shoe supports which would, course, cause damage both to the supports and to t roughing instrumentalities. Accordingly, means is pr vided for holding the instrumentalities aloft if a last wi or without an upper thereon is not locked in position the shoe support by the locking means described abov The safety means comprises a switch S1, LS4 and LS one for each unit (FIG. 16) which, if actuated, will pr vent a shoe feeler plate from being lowered into the pa of movement of the shoes as they advance toward t roughing instrumentalities and hence operation of a serv mechanism, which will be described hereinafter, whi controls the movement of the roughing instrumentaliti relative to the bottom of the shoe during the roughing o eration. To achieve this advantage is taken of the fa that the toe support 60 is displaced downwardly by pre sure of the toe of the shoe against the cushion 78 to low a roller R into engagement with a bar 21. The bar 21 pivotally supported at the upper ends of a pair of parall arms 23, the lower ends of which are pivotally connect by pins 25 to the base of the toe support. A pin 27 ar slot 29 at the lower end of one of the arms 23 limits tl pivotal movement and hence downward displacement the bar 21. A cam 31 is attached to the outer side of tl bar 21 and when the bar 21 is depressed the cam w pass beneath the switches LS4 and LS7 so that tl switches will not be actuated if a shoe has been locke to the pallet. If there is no shoe on the pallet or if fc some reason it is not locked in position and consequent the toe is not depressed, the cam 31 will actuate tl switches LS4 and LS7 to prevent lowering of the shc feeler plate and hence operation of the servo means.

During the roughing operation on the bottom of tl shoe the pallet 20 must be rigidly supported against dow ward displacement. Accordingly, the pallet 20 is provide at its lateral edges with rollers 178 (FIG. 4), which ar supported in longitudinally extending, spaced parall tracks 180 containing re-entrant grooves 182 for recej tion of the rollers. The tracks 180 are secured to brack members 184, the latter being mounted on and fastene to a transversely extending plate 186, the opposite edg of which are suitably secured to the frame structure of tl machine. The lower side of the conveyor does not requii support and hence the tracks are omitted at the low side.

Figure 2:
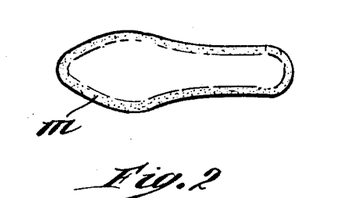
FIG. 2 is a plan view of the bottom of a lasted upper showing the marginal area which is to be roughed preparatory to application of an adhesive thereto and for attaching an outsole to the bottom.
Figure 2A:
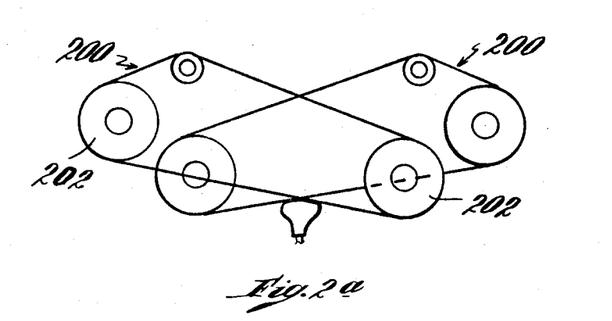
FIG. 2a diagrammatically illustrates, in elevation, a pair of endless bands of abrasive material arranged to operate on the opposite sides of a lasted upper supported bottom side up.
Figure 3:
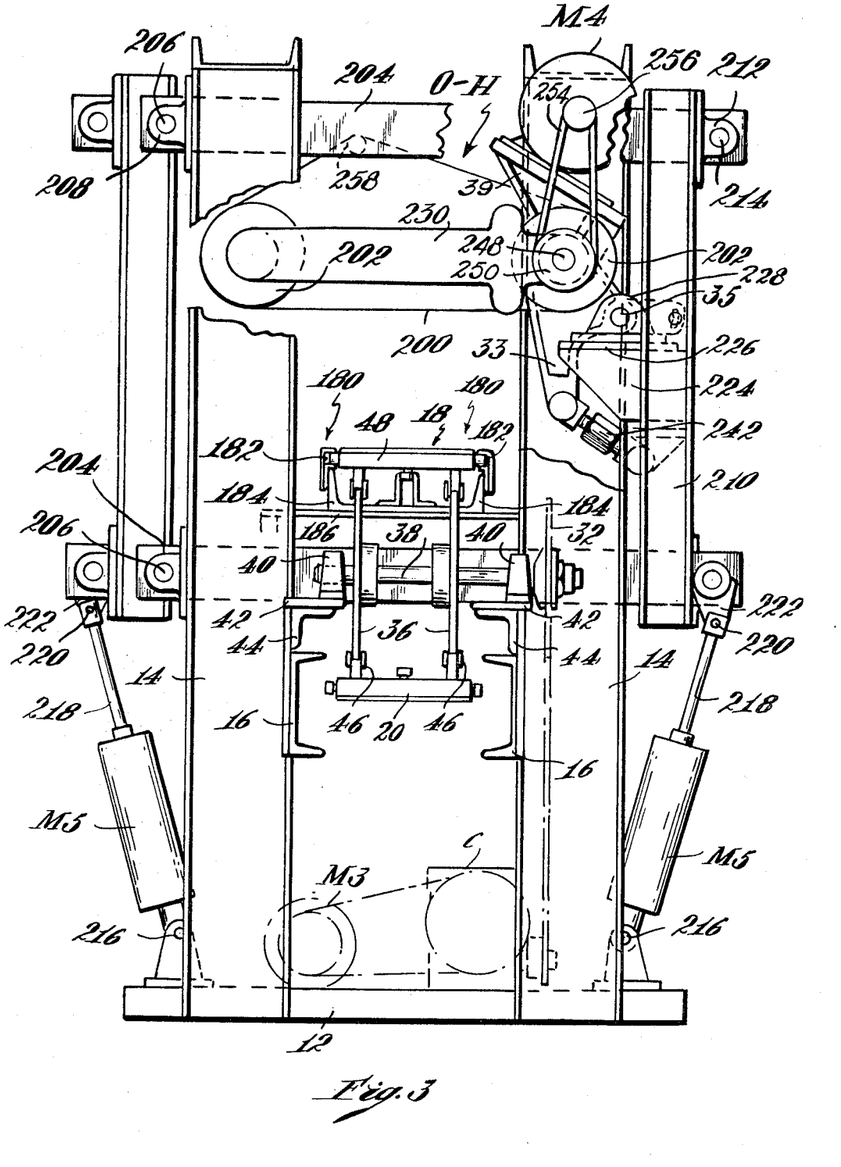
FIG. 3 is an elevation of the machine as seen from the right-hand end of FIG. 1.
Figure 10:
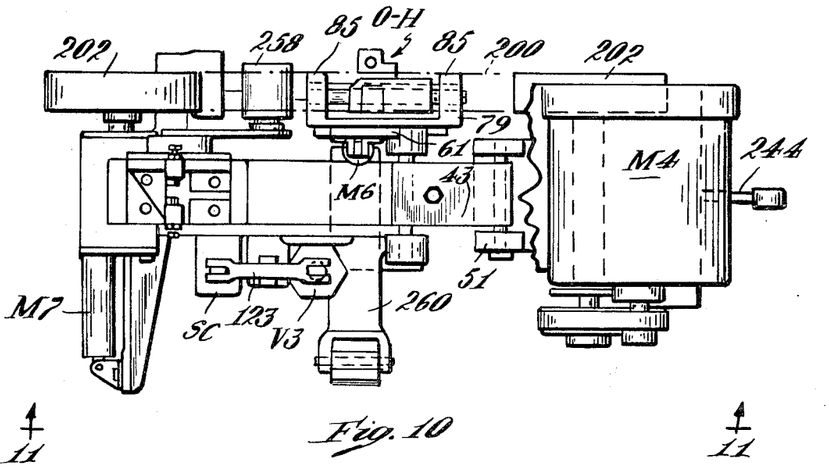
FIG. 10 is a plan view of one of the operating heads [of] the machine.
Figure 11:
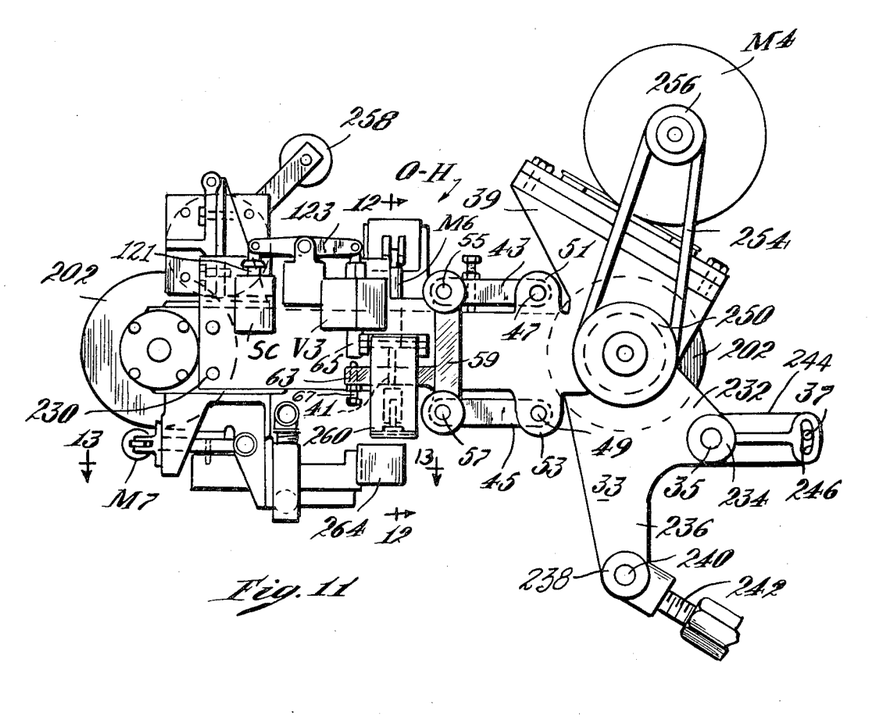
FIG. 11 is an elevation taken on the line 11—11 of [FI]G. 10.

The instrumentalities for performing the roughing o] eration on the bottom of the shoe are designed to roug the lasting margin m of the upper, that is the portion c the bottom adjacent the shoulder to which the outsole ultimately to be attached, as shown in FIG. 2. One of th instrumentalities is supported to operate on one side an the other on the opposite side (FIG. 2a) and they are c substantially identical makeup, some of the parts of or being right-hand and of the others left-hand, so that onl one will be described in detail herein. Each instrumenta ity as diagrammatically illustrated in FIG. 2a comprise an endless band or belt 200 supported on spaced pulley 202 transversely of the path of movement of the conveyc so that the lower run of the belt can be moved dowr wardly into engagement with the bottom of a shoe on th conveyor. The surface of the belt or band is coated wit a suitable abrasive and a motor M4 (FIGS. 3, 10 and 11 is provided for driving one of the pulleys and hence traversing the abrasive belt on the pulleys. The pulleys, abrasive belt and motor, as thus described, are disclosed in the previous mentioned application wherein these parts and others, which will be referred to in greater detail hereinafter, comprise one of the operating heads O–H of the machine and in the aforesaid application is mounted at one end on an axis parallel to the direction of movement of the conveyor and laterally thereof for movement angularly about the horizontal axis toward and away from the bottom of the shoe, so that the lower run of the belt approaches and recedes from the surface of the shoe on an arc having its center laterally of the conveyor. The present machine is designed to provide for rectilinear movement of each head O–H toward and away from the bottom of the shoe in contrast to the arcuate movement referred to. This is achieved by means of a parallel bar linkage comprising, as illustrated in FIG. 3, spaced parallel bars 204 pivotally connected at their left ends by pins 206 to bracket members 208 fastened to one of the channel members 14 and pivotally connected at their opposite ends to the opposite ends of a link 210 by means of bracket members 212 and pins 214. The linkage constituted by the bars 204 and the link 210 is raised and lowered relative to the conveyor by a motor M5, one end of which is pivotally connected by a pin 216 to the base of the machine and the other end of which has protruding from it a piston rod 218, the distal end of which is pivotally connected by a pin 220 and bracket plate 222 to the linkage. By supplying pressure to the lower end of the motor M5 the linkage can be raised and by supplying it to the upper end the linkage can be lowered. The characteristic of such a linkage is that the bars remain parallel throughout their movement so that the link travels perpendicularly relative to the bottom throughout its movement.

A block 224 having an upper horizontal surface 226 is fastened to the link 210 and provides support on its upper surface for a bracket 228 for pivotally supporting the aforesaid head O–H on the linkage transversely of the conveyor for movement of the lower run of the belt rectilinearly toward and away from the conveyor. Each head O–H, as will appear more clearly by reference to FIGS. 10 and 11, comprises a beam 230 which has at one end, the right end as shown in FIG. 11, a downwardly projecting, rigid mounting plate 33 provided with a laterally extending arm 232 and bearing boss 234 for receiving a pin 35 by means of which it is pivotally mounted to the bracket 228. The plate 33 has a downwardly extending arm 236 provided with a bearing boss 238 containing a hole for reception of a pin 240 by means of which the arm 236 is pivotally connected to one end of a link 242, the opposite end of which is pivotally connected to the link 210. The proportioning of the arm 236 and link 242 is such that throughout vertical movement of the parallel bar linkage, the beam 230 will move rectilinearly, that is perpendicularly with respect to the upper run of the conveyor. The arm 232 has a lateral extension 244 containing an arcuate slot 246 for receiving a clamping bolt 37 by means of which the mounting plate 33 may be tilted angularly about the axis of the pin 35 to incline the beam upwardly or downwardly with reference to the horizontal thereby to accommodate the lower run of the belt more closely to the angle of the bottom of the shoe with which it is to have contact.

The beam 230, as previously pointed out, has mounted on it for rotation pulleys 202. The pulley 202 at the right-hand side, as shown in FIGS. 10 and 11, is fast to one end of a shaft 248, the opposite end of which has on it a pulley 250. A bracket member 39 is secured to the upper side of the beam at this end and has mounted on it the motor M4 and a driving connection between the motor M4 and the pulley 250 is provided by the belt 254 entrained at one end about the pulley 250 and at its other end about a pulley 256 secured to the motor shaft. The belt 200 is entrained about the pulleys 202 with its lower run substantially parallel to the beam and its upper run passing over a tensioning roller 258, the details of which will not be described herein since it is essentially the same as disclosed in the aforesaid pending application.

Each operating head O–H is supported so as to be movable relative to the conveyor to follow the changes in level of the bottom of the lasted shoe upper as the latter moves beneath it and to substantially float while in engagement with the bottom of the lasted upper so as to apply a substantially uniform pressure to the bottom uninfluenced by the changes in level of the bottom. To this end each operating head O–H is controlled independently so as to bring the head into operative position and caused to follow the contour of the bottom by servo means as will now be described.

Figure 12:
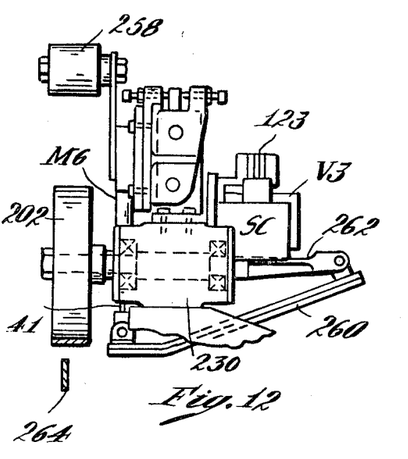
FIG. 12 is a fragmentary elevation showing the shoe [bo]ttom feeler plate.

Each servo means comprises a servovalve V3 (FIGS. 10 and 11) arranged to supply pressure to the upper and lower ends of the motor M5 by means of which the head O–H is raised and lowered. The servovalve V3 is operated to bring the head down to the approximate level of the bottom by a pivotally suspended feeler plate 260 pivotally mounted on the rear end of a horizontal arm 262 (FIG. 12) extending rearwardly from the beam 230 and sloping downwardly and forwardly therefrom in the direction of movement of the conveyor. The forward end of the feeler plate 260 is pivotally connected to the lower end of a piston rod 41 projecting downwardly from a motor M6 which normally supports the feeler plate 260 above the level of the bottom of the shoe travelling along with the conveyor. As a lasted shoe moves toward the head O–H and if it is locked to the shoe support on the conveyor, the motor M6 will be caused to displace the feeler plate 260 downwardly into the path of the bottom, so that the feeler plate 260, by engagement with the bottom of the last, will be raised and lowered to the extent of the changes in the level of the bottom of the shoe. The motor M6 is mounted on a parallel bar linkage comprising bars 43 and 45 pivotally connected at one end by pins 47 and 49 between upwardly and downwardly projecting ears 51 and 53 on the beam and at their opposite ends by pins 55 and 57 to the ends of a link 59. A carrier plate 61 is pivotally mounted to the linkage on the pins 55 and 57 and consequently moves rectilinearly therewith. The motor M6 is secured to the carrier plate 61. Hence as the feeler plate 260 is raised and lowered it raises and lowers the linkage and the carrier plate 61. The link 59 has a lateral arm 63 integral therewith which underlies a pilot 65 protruding from the lower end of the servovalve V3, so that movement of the linkage effects a corresponding movement of the servovalve, the latter being secured to the beam. An adjusting screw 67 threaded through the arm below the pilot provides for making adjustments in the extent of movement. By suitable adjustment when the feeler plate 260 is engaged with the bottom of a shoe the head O–H will automatically position itself with the lower run of the belt at a level just far enough above the bottom of the shoe so that the toe will not bump into the edge of the belt.

Figure 13:
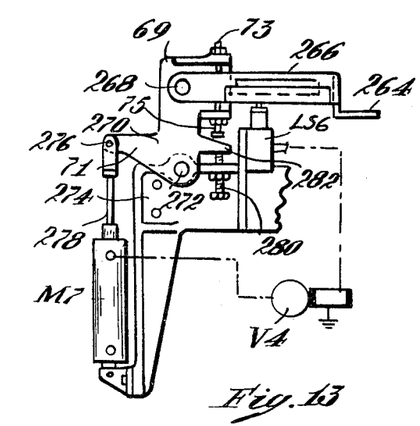
FIG. 13 is a fragmentary elevation of the toe gate.
Figure 16:
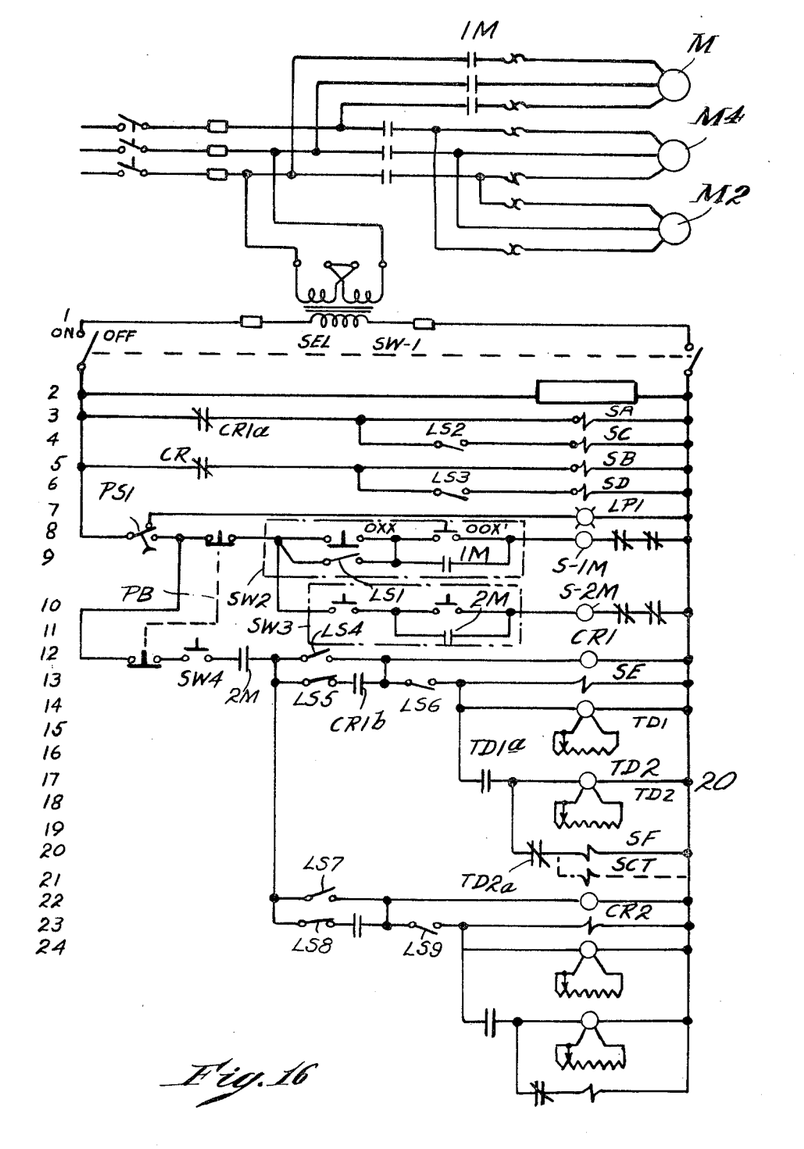
FIG. 16 is a diagram of the electrical circuit.

At approximately the point where the leading end of the shoe intersects the lower run of the belt there is a gate 264 (FIG. 13) situated transversely of the path of movement which is operable by contact of the leading end of the shoe therewith to actuate a switch LS6 (FIG. 16). The gate 264 is supported in position by a bar 266 pivotally connected by a pin 268 to one arm 69 of a bell-crank lever 270. The bell-crank lever is pivotally connected by a pin 272 to a bracket 274 mounted on the beam and its other arm 71 is connected by a pin 276 to the protruding end of a piston rod 278 projecting from a motor M7, also mounted on the bracket 274. An adjustable screw 280 by contact with a lug 282 opposite the arm 71 limits movement in a clockwise direction. The bar 266 is supported between spaced pins 73 and 75 which permit a small amount of angular movement sufficient so that when the shoe engages the gate 264 the bar may be disengaged from the switch LS6 to cause the latter to become operative. Operation of the switch LS6 energizes a solenoid-operable valve V4 which supplies pressure to the motor M7 in a direction to rotate the bell-crank lever 270 in a counter-clockwise direction and since the bar 266 is connected to the arm 69 of the bell-crank lever it will be swung away from the path of movement of the shoe to an out of the way position. Simultaneously pressure is supplied to the motor M6 to retract the rod 41 and hence raise the feeler plate 260 relative to the lower run of the belt so that the belt comes down into engagement with the bottom of the shoe.

Figure 14:
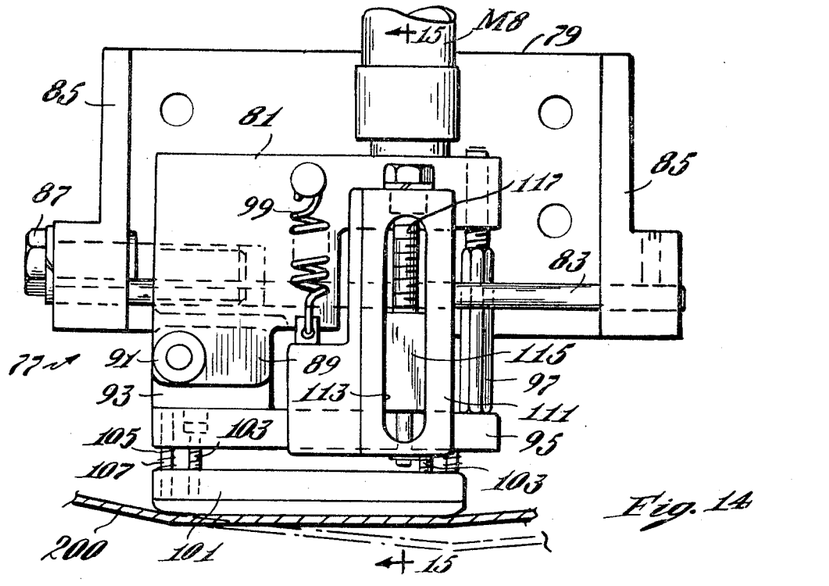
FIG. 14 is an elevation of the backing means for the [low]er run of the belt.
Figure 15:
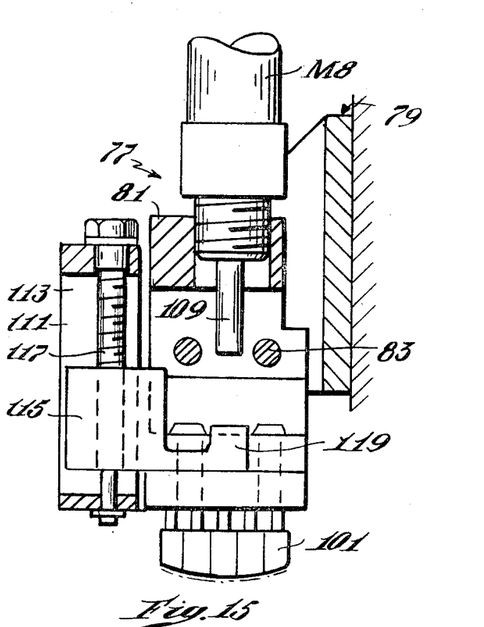
FIG. 15 is a section taken on the line 15—15 of FIG. [14]

A backing assembly 77 is supported in engagement with the inner side of the lower run of the belt to provide for controlled contact of the belt with the bottom and this assembly is bolted to a bracket 79 which, in turn, is bolted to the carrier plate 61 on the linkage. Thus changes in the level of the bottom of the shoe are transmitted through the belt and backing assembly 77 to the servo-valve V3 and the latter by controlling the supply of pressure fluid to the motor M5 will cause the head O–H to follow the changes in level of the bottom. The backing assembly 77 comprises a block 81 mounted on spaced parallel, horizontally disposed rods 83, the ends of which are fixed in spaced parallel flanges 85 on the bracket 79. The block 81 is thus adjustable along the lower run of the belt transverse to the direction of movement of the conveyor. A screw bolt 87 journaled in the left one of the flanges 85, as shown in FIG. 14 and threaded into the block 81, provides for such adjustment.

Figure 2B:
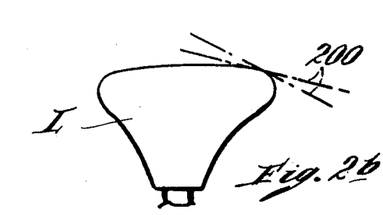
FIG. 2b is a vertical section through the bottom of a lasted upper showing angular adjustment of one of the endless bands at one side of the upper to maintain the surface thereof at an angle corresponding to the inclination of the upper at its point of contact therewith.

The block 81 has a downwardly projecting limb 89 to which is pivotally connected, by a pin 91, the upper projecting limb 93 of a second block 95. The block 95 is yieldably held against the lower end of a screw bolt 97 which is threaded into the block 81 by a coiled spring 99, one end of which is connected to one of the blocks and the other end of which is connected to the other of the blocks. A plurality of narrow fingers 101 are yieldably supported at the underside of the block 95 parallel to the direction of movement of the belt for conforming the transverse width of the belt to the curvature of that portion of the bottom with which the belt has contact. The fingers 101 are loosely supported by screw bolts 103 at each end and yieldably held downwardly by springs 105 mounted on pins 107 fixed at one end and slidable at the other end. It is desirable to change the angle of the fingers relative to the bottom to correspond to the changes in the angle of the bottom (FIG. 2b) particularly from a relatively flat angle at the forepart, to a sharper angle at the shank and then back to the flat angle at the heel. Accordingly, a motor M8 is mounted on the block 81 with its piston rod 109 projecting downwardly toward the block 95. The block 95 is provided with a guide 111 containing a vertical slot 113 in which is mounted a block 115. A screw 117 mounted in the guide and threaded through the block 115 provides for adjusting the block and an extension 119 which underlies the lower end of the piston rod 109 up and down relative thereto. Extension of the piston rod 109 will tilt the block 95 and hence the fingers 101 about the pin 91 relative to the bottom and adjustment of the block 115 will control the angle. Pressure is supplied to the motor M8 by adjustable timing means TD1-TD2, as shown in FIG. 16.

During movement of the bottom of the shoe relative to the lower run of the belt, the roughing operation is effected by the lower run of the belt travelling transversely of the shoulder of the shoe. The entire bottom from tip to heel end may be roughed or only a portion, for example, from the tip to the ball line or from the tip to the breast line and so means is provided for lifting the beam and hence the lower run of the belt off the bottom of the shoe. This is provided for by a solenoid SC (FIGS. 10 and 11) mounted on the beam adjacent the serv valve V3. The projecting end of the solenoid core 121 pivotally connected to one end of a rocker arm 12 the other end of which is pivotally connected to t upwardly projecting end of the valve pilot 65. The so noid is actuated by a switch LS5 mounted alongside t conveyor to pull the pilot 65 upwardly at a predetermin point and hence to elevate the O–H head thereby terminate the roughing operation. An adjustable cam 1 on the pallet (FIG. 4) by engagement with the swit LS5 controls the point of operation of the switch.

The apparatus as thus designed is substantially aut matic in operation after the operator has placed a last upper on the conveyor in that the last is automatical locked in position, the roughing instrumentalities a automatically moved into position to effect the roughi operation and then retracted, and that the roughed sh is automatically released so that the operator can r move it from the conveyor.

Figure 13A:
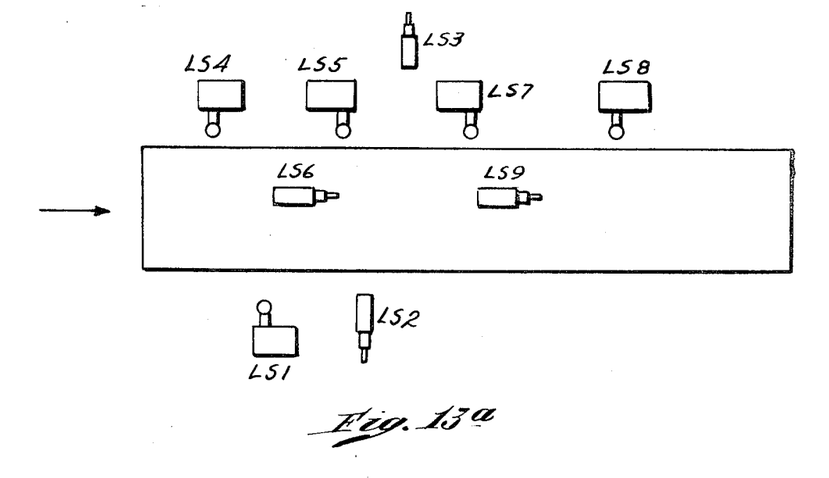
FIG. 13a is a diagram of the position of the switches [in] relation to the conveyor.

Operation of the machine is controlled by the arrang ment of switches along the conveyor as shown diagrar matically in FIG. 13a and the circuit diagram illustrat in FIG. 16.

Referring to FIG. 16 selector switch SW1 is turned the "on" position. The air pressure used for the ai operated motors in this apparatus should be set 75 p.s.i. and if when the selector switch is turned "o this pressure is below 75 p.s.i. an indicator light LP1 wi show this. A pressure-operated switch PSI is provide (line 8) and if the pressure is 75 p.s.i. or over it will aut matically close and the head solenoids SA and SB will t energized by relays CR1 (line 12, normally closed) ar CR2 (line 22, normally closed). Closing these relays wi raise the operating heads O–H toward their upper pos tion. As head No. 1 rises to its upper position it wi close limit switch LS2 (line 4) and this will energize th toe gate No. 1 reset solenoid SC (line 4), causing th toe gate 264 and feeler plate 260 to return to the read position. Head No. 2 will be similarly actuated.

Solenoid S1M is now energized by turning selectc switch SW2 (lines 8 and 9) to the start position. The coi tact OOX of selector switch SW2 will close momentaril (spring returned to run position) and solenoid S1M (lin 8) will be energized and held through an auxiliary conta 1M (line 9), switch OXX and the emergency stop switc PB which is normally closed. Solenoid S2M is energize in the same manner.

When the two solenoids S1M and S2M are energize auxiliary contact 2M (line 12) will be closed and thi interlocks the equipment so that the succeeding oper tion of roughing cannot be accomplished without turr ing on the roughing motors M4. The operating head "off" and "on" selector switch SW4 (line 12) is no turned to the "on" position. With the conveyor and rough ers now running a last is placed on the shoe support an is pneumatically locked down as previously describec This operation will depress the shoe feeler plate. Rough ing depends upon this procedure.

The shoe feeler plate trips limit switch LS4 (line 12 which closes momentarily and energizes relay solenoi CR1 which opens contact CR1a (normally closed, lin 3) and closes contact CR1b (normally opened, line 14) Solenoid relay CR1 remains energized through CR1b an aborts limit switch LS5 whereupon head No. 1 descend: Servo sensing (pneumatic) begins when the toe of th shoe strikes the toe gate. When the toe of the shoe nudge the toe gate, toe sensor switch No. 1 LS6 (normall closed) but held opened will close, energizing the to gate solenoid SE (line 13) and the tilting rougher dela timer TD1 (line 14). The toe gate swings open and th bottom feeler plate swings up to allow the shoe roughin cycle to begin. As the shoe proceeds timer TD1 times ou and contacts TD1a close to energize the tilt rough cycl timer TD2 (line 17), the tilt rougher solenoid SF (lin 20) and the counter-solenoid SCT (line 21) througl contact TD2a (line 20). After a predetermined time period timer TD2 will time out and open contacts TD2a, de-energizing solenoid SF, counter-solenoid SCT, and finish the tilt rough cycle. When the shoe reaches an operator selected point limit switch LS5 (abort No. 1 LS switch which may be mechanically positioned) is tripped open momentarily which de-energizes relay solenoid CR1. Contacts CR1a (line 3) are closed, energizing solenoid SA and sending operating head No. 1 to the up position. Timers TD1 and TD2, solenoid SF and counter-solenoid SCT are de-energized and the reset toe gate solenoid SE is de-energized to allow LS2 (line 4) to reset the toe gate solenoid SE when the operating head reaches its upward position.

Operating head No. 2 now proceeds through the same cycle as described with reference to operating head No. 1 except for the respective limit switches, solenoids, timers, and so forth.

If an emergency arises during the operation an emergency stop switch PB (lines 8 and 12) will abort all functions, stop the conveyor, stop the roughers and return either or both operating heads to the up position, resetting either or both of the gates.

In normal machine shut-down turning the conveyor selector switch SW2 (lines 8 and 9) to the "off" position will automatically position a pallet between operating heads 1 and 2 by reason of the pallet supported cam 127, tripping limit switch LS1 to an open position and hence de-energizes solenoid S1M.

Referring to FIG. 14 which shows the relative position of the switches, limit switch LS1 operates to stop the conveyor with a pallet between heads when the conveyor selector switch is turned to the "off" position as explained above with reference to the circuit diagram. Limit switch LS2 resets the toe gate of head No. 1, limit switch LS3 resets the toe gate of head No. 2, limit switch LS4 initiates downward movement of head No. 1 when a shoe is locked to the shoe support, limit switch LS5 initiates upward movement of head No. 1 when the roughing operation has been completed, limit switch LS6 initiates the roughing operation of head No. 1, limit switch LS7 initiates downard movement of head No. 2 when the shoe is locked to the shoe support, limit switch LS8 initiates upward movement of head No. 2 when the roughing operation is completed, and limit switch LS9 initiates the roughing operation of head No. 2.

It should be understood that the present disclosure is for the purpose of illustration only and that this invention includes all modifications and equivalents falling within the scope of the appended claims.

We claim:

1. In a machine for operating on shoes, instrumentalities for performing an operation on the bottom of a lasted upper while still on the last, a conveyor for moving the lasted uppers on their lasts successively to said instrumentalities, pressure-operable locking mean on the conveyor for locking a last mounted on the conveyor thereto, and means for supplying pressure to said pressure-operable locking means to effect locking while the conveyor is in continuous motion comprising a source of pressure, a coupling element connected to said source, said coupling element being movable relative to said source and to the conveyor, and means for effecting movement of said coupling element to connect it to said pressure-operable locking means at the latter approaches it and to disconnect it from said pressure-operable locking means as the latter recedes.

2. A machine according to claim 1, wherein said coupling element is movable through a predetermined distance with the conveyor and there is means for connecting it to and disconnecting it from said pressure-operable locking means within said predetermined distance.

3. Apparatus according to claim 1, comprising means for maintaining the pressure-operable means in locking position following disconnection of said coupling element.

4. Apparatus according to claim 3, comprising release means associated with said pressure-operable locking means to effect release of the pressure therefrom, and means situated beyond the instrumentalities in the direction of movement cooperable with said release means to effect operation of said release means.

5. Apparatus according to claim 1, wherein said pressure-operable locking means comprises a cylinder containing a piston movable by pressure supplied to the cylinder to effect movement of the locking means to locking position, and a one-way valve through which pressure is supplied to the cylinder operable to retain the locking pressure following disconnection of the coupling element.

6. Apparatus according to claim 5, comprising means for releasing the pressure from said cylinder.

7. Apparatus according to claim 1, wherein said pressure-operable locking means comprises a toe rest and a heel pin mounted on the conveyor, said heel pin being movable relative to the toe rest, and a pressure-operable motor on the conveyor operable to effect movement of the pin in a direction to press the toe of the shoe mounted on the pin against the toe rest.

8. A conveyor for transporting lasts bottom side up with or without uppers thereon comprising locking means on the conveyor with which the necks of the lasts may be engaged when unlocked, to move the lasts loosely supported thereon along a predetermined path, means operable to effect locking of said locking means rigidly to fix the lasts to the conveyor, said means being pressure-operable, a source of pressure, and a coupling element connected to said source, said coupling element being movable relative to said source and to the conveyor while the conveyor is in motion to connect the coupling element to the pressure-operable means to effect locking and then disconnect it therefrom without interrupting continuous movement of the conveyor.

9. In a machine for operating upon shoes, instrumentalities for performing an operation on the bottom of a lasted upper while still on the last, a conveyor for moving the lasted uppers on their lasts successively to said instrumentalities, mounting means on the conveyor for supporting the lasts thereon, each mounting means comprising a heel and toe rest, said toe rest being fixed and said heel rest comprising a part engageable with the heel end of the last, said latter part being movable from a retracted position forwardly relative to said toe rest to force the toe of a lasted shoe against the toe rest, pressure-operable means for moving the heel rest from said retracted position to said forward position, and means movable inwardly from a position laterally of the conveyor as each mounting means approaches to effect operation of said pressure-operable means and back to said lateral position following operation of said pressure-operable means.

10. A machine according to claim 9, wherein said toe rest comprises a cushion, said heel rest comprises a pin for engagement with a ferrule in the neck of the last, said pin being supported for pivotal movement about a horizontal axis toward the toe rest, a spring normally holding the pin tilted rearwardly relative to the toe rest to enable placing a last thereon, and wherein said pressure-operable means is operably associated with the pin for rotating the latter forwardly relative to the toe rest after the lasted upper is mounted thereon to press the toe of the last firmly against the cushion.

11. In a machine for operating on shoes, an instrumentality for operating on the bottom part of a lasted upper while still on the last, a conveyor movable along a path relative to the instrumentality to present successive portions of the bottom of the upper to the instrumentality, means supporting the instrumentality at said position for movement relative to the bottom, level-sensing means operative in response to the presence of a shoe as it moves toward the instrumentality to move the latter to a level close to the bottom, detector means operable in response to movement of the leading end of the shoe into the field of operation of said instrumentality to retract the level-sensing means and effect movement of the instrumentality into engagement with the bottom of the shoe, and means operable as the bottom of the shoe advances in contact with the instrumentality to cause the instrumentality to follow the changes in level of the bottom.

12. A machine according to claim 11, comprising a motor for effecting elevation of the level-sensing means, and wherein said detector means comprises a gate supported transversely of the conveyor, said gate being movable from said position to a lateral out of the way position, a motor for effecting movement of the gate to said lateral position, means operable by contact of the leading end of the shoe with the gate as a shoe reaches a position to be operated on simultaneously to effect operation of said motor for effecting movement of the gate and to effect operation of said motor for effecting retraction of the level-sensing means.

13. A machine according to claim 11, wherein said support for the instrumentality is a beam movable rectilinearly perpendicular to the conveyor, and angularly about one end on an axis parallel to the conveyor, said instrumentality, level-sensing means and detector means being mounted on the beam, said level-sensing means being movable relative to the instrumentality to an operative position to support the instrumentality above the bottom of the shoe and to an inoperative position to permit the instrumentality to have contact with the bottom of the shoe, said servo being alternatively responsive to the level-sensing means and to the instrumentality, and said detector means being operable to retract the level-sensing means.

14. A machine according to claim 11, wherein said detector means is a gate comprising a bar supported transversely of the path of travel for lateral movement out of the path of travel and limited angular movement while in said path of travel, a bell-crank lever supported at one side of the path of movement of travel for rotation about an axis perpendicular to the path of movement with one arm parallel to the conveyor and connected to the bar and the other arm at right angles to the conveyor, a switch supported in a position to be operated by the limited angular movement of the gate while in the path of travel produced by engagement of the leading end of the shoe therewith, and means connected to the other arm of the bell-crank operable by actuation of said switch to rotate the bell-crank in a direction to move the bar to said lateral position out of the path of movement.

15. A machine according to claim 11, comprising a parallel bar linkage mounted on the supporting means, and means pivotally supporting the level-sensing means on said parallel bar linkage.

16. In a machine for operating on the bottoms of shoes, instrumentalities, each comprising an endless belt, means supporting the belt transversely of the path of movement of a conveyor on which shoes are mounted for movement successively into operative position for rectilinear movement perpendicularly relative to the bottoms of the shoes mounted on the conveyor, power-operable means for effecting said movement, a shoe bottom feeler operable by engagement with the bottom of the shoe as the latter moves toward the belt to position the latter at the level of the bottom with the lower run adjacent the bottom, backing means on the supporting means in engagement with the inner side of the lower run of the belt at a position substantially above the shoulder of the last, said backing means comprising a plurality of relatively narrow, transversely extending spring-biased fingers parallel to the lower run of the belt and means supporting the fingers for adjustment transversely, angularly and perpendicular relative to the bottom, and a sensing device operable by the leading end of the shoe to elevate said feeler thereby to lower the lower run of the belt into engagement with the bottom, said backing means being movable relative to the supporting means as the lower run of the belt is displaced by the changes in the level of the bottom of the shoe to effect operation of the power-operable means for raising and lowering the supporting means a corresponding amount.

17. A roughing machine comprising a roughing device embodying a part movable in a predetermined path, conveyor embodying a plurality of spaced supports thereon for supporting shoes for movement along a path to bring them successively into the path of said part to rough a portion of the bottom, servo means operable to maneuver the roughing device and moving part thereof into engagement with the bottom of each shoe as it is moved by the conveyor into the field of action of the roughing device, means operable automatically to lock each shoe to the conveyor as it approaches the field of action of the roughing device, and means operable in the absence of operation of said locking means to lock a shoe to the conveyor to prevent operation of said servo means.

18. Apparatus according to claim 17, comprising means normally disabling the servo means and means operable by locking of a last to the conveyor to render said disabling means inoperative.

19. In a machine embodying instrumentalities for operating on the bottoms of lasted shoe uppers, a conveyor for moving shoes successively into the zones of operation of said instrumentalities, fluid operable means for maneuvering the instrumentalities into engagement with the bottoms of the shoes and maintain them in engagement therewith throughout predetermined portions of the bottoms as the shoes pass through said zones, and pressure sensitive means operable at a predetermined fluid pressure to enable said fluid-operable means and at a pressure lower than said predetermined pressure to disable said fluid-operable means.

20. In a machine for operating on shoes, instrumentalities for operating on the bottom part of a lasted upper while still on the last, a conveyor movable along a path relative to the instrumentalities to present successive portions of the bottom of the lasted upper thereto, means supporting the instrumentalities for rectilinear movement perpendicular to the path of movement of the conveyor means mounting each instrumentality for adjustment about an axis parallel to the path of movement, and means for effecting a change of angular position of each instrumentality to cause it to confront the transverse slope of the bottom.

21. In a machine for operating on shoes, instrumentalities for operating on the bottom part of a lasted upper while still on a last, a conveyor movable along a path relative to the instrumentality to present successive portions of the bottom of the lasted upper thereto, said instrumentalities comprising driven endless bands supported with one run transverse to the path of travel of the conveyor, and means supporting said instrumentalities for rectilinear movement perpendicular to the path of movement of the conveyor, said means comprising a parallel bar linkage by means of which movement of said run toward and away from the path of travel of the conveyor may be maintained rectilinear and perpendicular thereto, and means for effecting movement of the parallel bar linkage to cause said one run of the band to follow the changes in level of the bottom of the lasted upper on the conveyor.

22. In a machine for operating on shoes, instrumentalities for operating on the bottom part of a lasted upper while still on the last, a conveyor movable along a path relative to the instrumentalities to present successive portions of the bottom of the lasted upper thereto, and means supporting said instrumentalities for rectilinear movement perpendicular to the path of movement of the conveyor, said supporting means comprising two parallel bar linkages arranged tandemly in the direction of movement of the conveyor in spaced parallel relation each of which supports an instrumentality above the path of the conveyor for operation on the bottom of the lasted upper, one at one side and one at the other side as the lasted upper travels between them.

23. In a machine for operating on shoes, instrumentalities for operating on the bottom part of a lasted upper while still on the last, a conveyor movable along a path relative to the instrumentalities to present successive portions of the bottom of the lasted upper thereto, means supporting said instrumentalities for rectilinear movement perpendicular to the path of movement of the conveyor, servo means operable by engagement of the bottom of the lasted upper with the instrumentalities to cause the instrumentalities to follow the bottom, electrically responsive parts connected to the servo means and operable by activation to move the servo means in a direction to elevate the instrumentalities, switch means for effecting operation of said parts, and cams situated adjacent the conveyor operable to actuate said switches, each cam being adjustable parallel to the conveyor to enable varying the point of lift-off of the instrumentality relative to the leading end of the bottom of the shoe.

References Cited

UNITED STATES PATENTS

| | | |
|---|---|---|
| 2,005,610 | 6/1935 | Card. |
| 3,077,098 | 2/1963 | Pearsall et al. _________ 69—6.5 |
| 3,134,205 | 5/1964 | Vegsund __________ 51—141 X |
| 3,371,510 | 5/1968 | Dunlap _____________ 69—6.5 |

ALFRED R. GUEST, *Primary Examiner.*

U.S. Cl. X.R.

12—1, 17